United States Patent Office 3,338,640
Patented Aug. 29, 1967

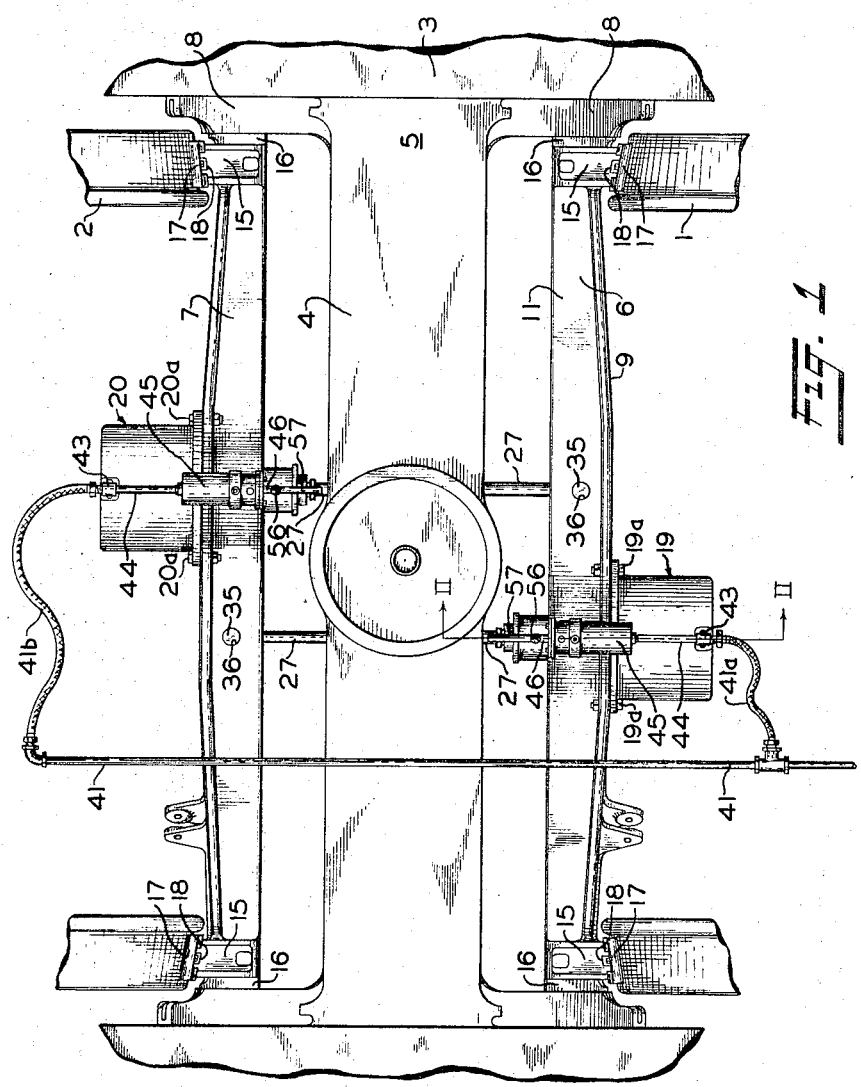

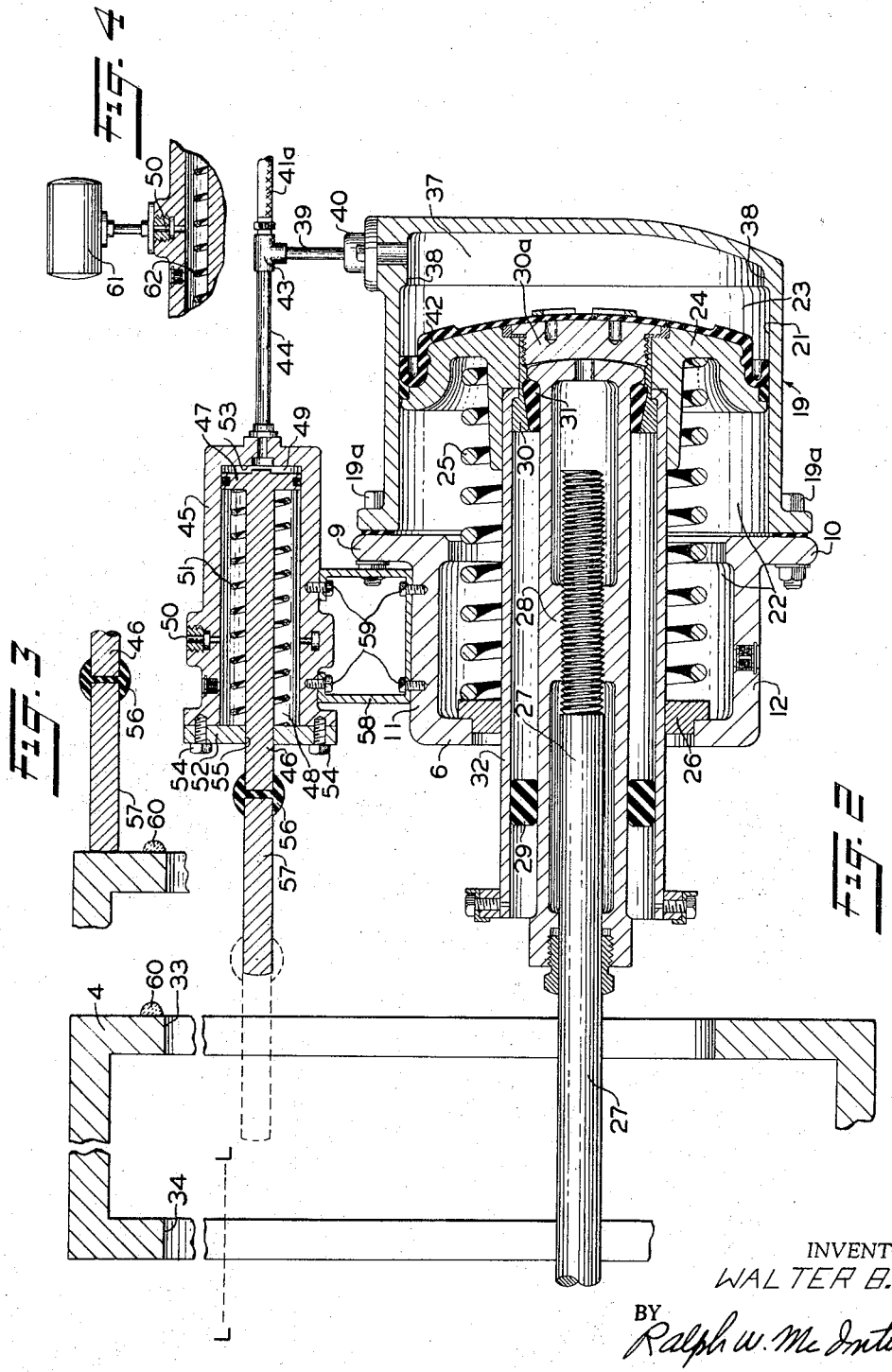

3,338,640
EMPTY AND LOAD BRAKE APPARATUS
Walter B. Kirk, Pitcairn, Pa., assignor to Westinghouse Air Brake Company, Wilmerding, Pa., a corporation of Pennsylvania
Filed Nov. 27, 1964, Ser. No. 414,094
9 Claims. (Cl. 303—23)

This invention relates to empty and load brake apparatus for railway rolling stock, and, more particularly, to empty and load brake apparatus for freight cars equipped with foundation brake rigging mounted on the car truck and having the brake cylinders carried directly on the brake beams in a manner to effect application of brake shoes to the wheels of the car truck by reaction between the beams or between the beams and the truck bolster.

Patent No. 2,958,398, issued Nov. 1, 1960 to George K. Newell and assigned to the assignee of the present application, discloses a recently developed type of freight car truck foundation brake rigging, now in service, wherein each brake beam of a pair on a car truck carries a brake cylinder, with the piston rods of the cylinders extending in parallel-spaced relation, symmetrically on opposite sides of the longitudinal center line of the car truck, and through the truck bolster to the other brake beam such that when fluid pressure is supplied to said cylinders the brake beams move away from each other and thereby apply the brake shoes on the beams to the treads of the car wheels.

The aforesaid basic foundation brake rigging operates to provide a uniform braking force for a given brake cylinder pressure regardless of load on the car. Accordingly, various proposals have been made for providing "empty and load" operation in the aforesaid type of foundation brake rigging.

One arrangement which has been proposed for adapting this described type of foundation brake rigging for so-called "empty and load" operation is of a pneumatic type employing a pneumatically operated strut cylinder to measure the "empty" or "load" condition of a car, by the degree of deflection of a part such as the bolster which deflects downwardly with load and called the "sprung part" of a car truck with respect to a part of the truck which does not change in height with load and called the "unsprung part." This strut cylinder operates to condition a combination change-over valve and relay valve to correspondingly control the degree of braking pressure supplied to the brake cylinders. This type of equipment is operatively effective, but the cost of this additional apparatus discourages its use.

Another arrangement for providing "empty and load" operation to this type of foundation brake rigging is of a relatively simple, low-cost mechanical construction wherein a lever actuated by the beam-carried-brake cylinder piston cooperates with a vertically inclined fulcrum rib on the bolster of the car truck, so as to increase the mechanical advantage of the piston-operated lever with increasing deflection of the sprung part of the car truck as load on the truck increases, thereby correspondingly increasing the braking force. This type of apparatus is also operatively effective, but requires a special design of the basic foundation rigging, involving repositioning of the brake cylinders on the beams, and is not readily adapted to the basic foundation brake rigging hereinbefore described.

It is the purpose of the present invention, therefore, to provide a relatively simple, low-cost arrangement which is partly mechanical and partly pneumatic in character, for adapting the hereinbefore-described basic foundation brake rigging for "empty and load" operation.

According to the present invention, an auxiliary or strut cylinder is provided for connection to a corresponding piston chamber of a brake-beam-carried brake cylinder. A spring-biased piston operable in the strut cylinder has a stem or rod which cooperates with a slot in the car truck bolster in such manner that in the "empty" or lightly loaded condition of the car, the slot in the car truck bolster is in registry or alignment with the piston stem in the strut cylinder. Upon the supply of fluid pressure to the brake cylinder on the brake beam, the piston in the strut cylinder shifts, due to non-interference by the bolster with its stem, to provide additional volume to the brake cylinder and also vent fluid pressure to the value of the spring biasing the piston which thereby limits the brake cylinder pressure established to a safe value. Under "load" condition, however, the slot on the car truck bolster is moved downwardly, due to downward deflection of the bolster under load, and out of registry with the piston stem of the strut cylinder. Upon the supply of fluid pressure to the brake cylinder on the brake beam, movement of the piston in the strut cylinder is blocked. Thus, due to the relatively smaller volume connected to the brake cylinder, a higher braking pressure is established therein for a given supply pressure.

In the accompanying drawings:

FIG. 1 is a plan view of a brake rigging for a two-axle car truck of the type in which the brake cylinders are carried directly on the brake beams, showing the novel arrangement for providing "empty and load" operation thereof;

FIG. 2 is an enlarged fragmental vertical sectional view, substantially on line II—II of FIG. 1, of one of the brake-beam-carried brake cylinders, showing the strut cylinder and its relation to the car truck bolster;

FIG. 3 is an enlarged fragmental vertical view of a portion of the strut cylinder piston rod engaging the side face of the bolster under "load" condition; and FIG. 4 is a portion of a sectional view of the strut cylinder, showing a modified embodiment in which a volume reservoir is connected to the strut cylinder chamber when the travel of the strut cylinder piston uncovers a port.

Description

Referring to FIG. 1 of the drawings, two pairs of wheels 1 and 2, respectively, are secured to opposite ends of each of two separate axles (not shown), the outer ends of which are journaled in a conventional manner (not shown) in the truck side frames 3 which, in turn, are joined together by the truck bolster 4 to form a conventional two-axle four-wheel railway car truck 5.

The type of car truck foundation brake rigging with which the present invention is operative is conventional, and only a brief description is provided hereinafter.

The brake rigging for the described car truck comprises a pair of brake beams 6 and 7 extending crosswise of the car truck and in parallel-spaced relation to each other and the truck bolster 4. The brake beams 6 and 7 are symmetrically arranged on opposite sides of the truck bolster 4 and are movably supported at each end by guide channel members 8 on the truck side frames, as explained more fully hereinafter.

The brake beams 6 and 7 are hollow beams each having flanges 9 and 10 extending outwardly from their respective webs 11 and 12.

A brake head 15 is suitably attached as by bolts or rivets or formed integrally to each end of each of the brake beams 6 and 7. A guide foot 16 is secured to each end of each of the brake beams and extends into the groove formed in the channel guide members 8 for movably supporting the brake beams. The channel guide members are slanted vertically so as to support the brake beams 6 and 7 at the proper height above the rails slightly below the horizontal diameter of the wheels, in a manner to permit bodily movement of the brake beams radially toward and away from the associated wheels.

Each brake head 15 carries a composition brake shoe 17 for braking engagement with the tread of an associated wheel when a brake application is made. Each shoe 17 has the customary backing plate assembly for receiving a retaining key 18 in the well-known manner to maintain the respective shoe secured to the respective brake head 15.

The brake shoes 17 are moved into and out of engagement with their associated wheels by means of fluid pressure supplied to and released from brake cylinders 19 and 20 secured to the brake beams by a plurality of bolts 19a and 20a, as shown in the drawings.

The brake cylinders 19 and 20 are identical and each comprises a cylinder bore 21 having formed therewithin a non-pressure chamber 22 and a pressure chamber 23, on opposite sides of a piston 24 which is slidable within said cylinder bore. The piston 24 is subject on one side to the fluid pressure in said pressure chamber 23 and on the opposite side to the forces of a coil spring 25 extending through the non-pressure chamber 22 to a spring seat 26.

A push rod 27 having an adjustable end means 28 is suitably secured by a friction ring 29 and a keeper or sleeve 30 and a friction ring 31 within a hollow piston stem 32 which, in turn, is secured to the piston 24 by the same keeper 30 and friction ring 31 on the non-pressure side of said piston. A large nut 30a screws into the outer end of the keeper 30 and tightens against a recessed shoulder in the pressure face of piston 24 to hold the keeper. The push rod 27 within the piston stem 32 extends through the non-pressure chamber 22 and thence through a pair of slots 33 and 34 formed or cut in the bolster 4 to the opposite brake beam where it is secured by a pin 35 pasisng through a hole 36 in the brake beam webs and a hole (not shown) in the end of the push rod. As shown in FIG. 1, push rods 27 for each brake cylinder 19 and 20 extend in opposite directions from their respective cylinders through the bolster 4 to the opposite brake beams where they are secured, such that when fluid under pressure is supplied to the pressure chambers of the respective cylinders, the push rods will apply a force to opposite brake beams. The effective length of the push rods may be suitably adjusted by rotation of end means 28 on the push rod 27 and locked by use of the keepers 30 and friction rings 29 and 31 encircling the adjusting end means 28 and frictionally engaging the piston stem 32.

Referring to FIG. 2, a recess chamber 37 is provided at the one end of the pressure chamber 23 opposite the piston 24, such that fluid under pressure is supplied, when desired, to the entire face of the piston when the piston is in its release position at the extreme right end of bore 21 against the stops 38. A pipe 39, suitably attached as by threading to a fitting 40, connects the pressure chamber 23 and recess chamber 37 to the usual brake cylinder pipe 41, via flexible branches 41a and 41b, leading from the usual brake controlling device of the AB type (not shown) of the air brake system of the train. Supply of fluid under pressure to the pressure chamber 23 in one brake cylinder under the control of the usual brake controlling device (not shown) acts on a packing cup 42 attached to the pressure face of piston 24 and thereby effects movement of the piston 24 to the left (as viewed in FIG. 2) against the biasing force of the spring 25 to cause the said piston to move the adjusting end means 28 on the end of the push rod 27, and thereby move the push rod 27 and the connected brake beam 7 in one direction, while simultaneously supply of fluid under pressure to the pressure chamber 23 of the other brake cylinder causes movement of its respective piston adjusting head, push rod and connected brake beam 6 in the opposite direction to effect braking contact of the brake shoes 17 carried by the brake heads 15 on the brake beams 6 and 7 with the tread of their respectively associated wheels, as is explained more fully hereinafter.

Connected to each of the pipes 39 and the brake cylinder pipe 41 at a T-fitting 43 adjacent to each brake cylinder is a pipe 44 connected to an empty and load responsive apparatus including a strut cylinder 45 and a strut 46.

The strut cylinder 45 (shown in normal or brake release position in FIG. 2) comprises a strut piston 47 having on one side a stem or strut 46 of suitable length extending through a non-pressure chamber 48, and a pressure chamber 49 on the opposite side. A vent port 50 is positioned in the strut cylinder at a location to be at one end of the pressure chamber 49 when the piston 47 is subject to fluid under pressure and moved to its extreme left-hand position to thereby vent said pressure chamber, as explained hereinafter. A spring 51 selected, for example, as a forty pound spring, for reasons explained hereinafter, encircles the strut 46 between the end wall 52 of the non-pressure chamber and the piston 47 in a manner to bias the piston 47 to the right (as shown in FIG. 2) toward the end wall 53 of the pressure chamber. The end wall 52 of the non-pressure chamber comprises a plate bolted to the strut cylinder by bolts 54 and having a central hole 55 therethrough through which the strut 46 slidably extends. The outer end of the strut 46 is provided with a flexible rubber coupling unit 56 connecting the strut 46 with an engaging portion 57 of said strut, such that the end of the strut is to a limited degree flexible to prevent binding thereof with the bolster 4 during braking under load conditions, as will be more fully explained hereinafter.

The strut cylinder 45 is illustratively positioned directly above and secured to the brake cylinders by use of a bracket 58 and bolts 59 in a manner such that the strut 46 is aligned with and extends towards the slot 33 in the bolster 4.

It should be understood that the bolster 4 is supported by coil springs (not shown) at opposite ends thereof on the unsprung truck side frames, in a usual well-known manner, such that the bolster will be biased downwardly toward the tracks with compression of the aforesaid springs when the car is loaded. The degree of downward movement of the bolster is dependent on the degree of loading of the car. The slot 33 in the bolster is made of a predetermined length so that it is possible for the engaging portion 57 of strut 46 to extend therethrough when the car is empty or partially loaded, as shown in dotted lines in FIG. 2. When the car is loaded above a predetermined load, hereinafter referred to as "load" condition, the bolster will be biased downward sufficiently so that the slot 33 is no longer aligned with the engaging portion 57 of the strut 46 and, therefore, the engaging portion does not enter the slot 33 but engages the side face of the bolster, as is shown in FIG. 3, to thereby correspondingly alter the effective braking force, in a manner described hereinafter.

*Operation*

With the car in "empty" or lightly loaded condition, the bolsted 4 is vertically positioned with respect to the strut 46 and push rod 27, as shown in FIG. 2. When it is desired to effect a brake application, fluid under pressure is supplied under the control of the usual brake controlling valve device (not shown) of the air brake system to the brake cylinder pipe 41, and thence by pipe 39 to the pressure chamber 23 of each brake cylinder simultaneously. The fluid under pressure in the pressure chamber acts on the piston 24 which, in turn, acts on the adjusting end means 28 and push rod 27, thereby effecting movement of the two push rods 27 in each car truck simultaneously in opposite directions.

Since the operation of each brake cylinder 19 and 20 and its corresponding brake beam on each car truck is substantially the same, except that the respective brake beams 6 and 7 are moved in opposite directions, a description of operation of only the brake cylinder 19 and associated brake beam 6 is deemed to be sufficient for an understanding of the operation of the equipment.

As the push rods 27 on each car truck are moved in opposite directions, the brake beams 6 and 7 on each car truck also move in opposite directions and thus the brake shoes 17 carried by the beams are brought into braking contact with the wheels of the truck to effect a braking action on the wheels.

As fluid under pressure is supplied to the pressure chamber 23 of each brake cylinder, fluid under pressure is simultaneously supplied by way of pipe 44 to pressure chamber 49 in each of the strut cylinders 45, where the resistance of spring 51 prevents movement of the piston 47 until forty pounds pressure is obtained, whereupon the piston 47 is shifted leftward until the port 50 is uncovered. With the car empty and the bolster 4 positioned upwardly, as shown in FIG. 2, it will be understood that movement of the piston 47 to the left against the biasing force of spring 51 is permitted because the strut 46 is permitted to move to the left with the engaging portion 57 thereof passing into and through the slot 33 in the bolster 4, to the position as shown in dotted lines in FIG. 2. It will be apparent that while the brake beam 6 and brake cylinder 21 move away from the bolster 4 incidental to a brake application, the piston strut 46 is of sufficient length that, notwithstanding, it would engage the side of the bolster unless allowed to pass through the slot 33. The effective volume of the pressure chamber 23 is thus enlarged by the addition thereto of the volume of chamber 49 as the piston 47 moves to the left. The pressure obtained for a given operation of the brake controlling valve device is thus lower than it is for the brake cylinder pressure chamber only, mostly due to the added volume, and since any pressure in excess of forty pounds is relieved via vent port 50. It will be understood that with the vent port 45 uncovered, fluid under pressure is momentarily released from the pressure chamber 49 to atmosphere at a rate according to the size of the orifice of vent port 50. The fluid pressure in both the pressure chamber 49 and brake cylinder pressure chamber 24 immediately falls, allowing the piston to be moved back in the right-hand direction by spring 51 to close the port, thereby limiting the fluid pressure effective in the brake cylinders to the appropriate degree, such as forty pounds, for braking an empty car without danger of wheel sliding.

*"Load" operation*

When the car is in a loaded condition, the weight of load will move the bolster downwardly against the car springs to a vertical position wherein the slot 33 therein is no longer in alignment to receive the engaging portion 57 of the strut 46. As shown in FIG. 2, when the car is fully loaded, the top of the bolster will be moved downward to approximately the location of the dotted line L—L.

When a brake application is effected under the "load" condition, the operation is similar to that described when the car is empty, with the exception that, in this case, the supply of fluid under pressure to the pressure chamber 49 can move the piston 47 to the left only a small distance before the engaging portion 57 of the strut 46 engages the side of the bolster 4, as shown in FIG. 3. Engagement of the engaging portion 57 with the bolster 4 prevents not only the increasing of the effective volume of brake cylinder pressure chamber 23, as explained hereinbefore, but also prevents any pressure-reduction venting of the pressure chamber 49 or 23 by the vent port 50. Accordingly, with no volume added to that of the brake cylinder pressure chamber 23, equilization pressure for a given operation of the brake controlling valve device is correspondingly higher, such that maximum braking effect is obtained when the car is fully loaded, as desired.

A bead 60 is welded on the bolster 4 immediately above the opening of slot 33 to prevent the engaging portion 57 of the strut 46 from sliding down the bolster and passing through the slot 33 under rough track conditions where bouncing of the car may occur. The provision of the bead 60 thereby prevents undesired accidental reduction of the braking force under a load condition to that for an empty condition.

The rubber coupling unit 56 is provided in the strut to permit limited flexing of the engaging portion 57 should the car bounce during empty load brake conditions to prevent the engaging portion from breaking if it should accidentally contact the end of slot 33. The coupling unit 56 would also prevent the engaging portion 57 from binding on the bolster 4 as bouncing occurs under full load brake conditions.

It can thus be seen that the predetermined positioning of the slot 33 determines when the strut 46 will pass therethrough or not, and thus determines the change-over from "empty" brake condition to "load" brake condition.

FIG. 4 illustrates another modification whereby the vent port 50 is connected to an additional volume 61 instead of atmosphere. The piston spring 62, resisting the movement of the strut piston in this modification, is of lesser value than that of the spring 51 of the previously-described embodiment. For example, spring 62 may be a fifteen pound spring. Thus, upon supply of fluid under pressure to the brake cylinders, spring 62 initially resists movement of piston 47 to insure that sufficient brake cylinder pressure is established to move the brake shoes into engagement with their respective wheels before the vent port 50 in the strut cylinder is uncovered to permit the brake cylinder pressure to be admitted to the additional volume 61. The addition of the volume 61 acts to lower the equilization pressure, for a given operation of the brake controlling valve device, to limit the braking effect to a safe value for an empty car.

Having now described the invention, what I claim as new and desire to secure by Letters Patent is:

1. A foundation brake rigging for a railway car truck of the type having sprung and unsprung members comprising, in combination:
 (a) a pair of brake beams disposed in parallel relation and movably supported on the truck frame for movement toward and away from each other to effect brake application and brake release,
 (b) brake cylinder means carried by each brake beam and effective when pressurized to react against the other beam to move the beams apart, and when depressurized to effect movement of the brake beams toward each other,
 (c) a strut cylinder device having a bore and including:
  (i) a piston slidably operable in said bore,
  (ii) a pressure chamber at one side of said piston in constant communication with at least one of said brake cylinder means,
  (iii) spring means biasing said piston toward a position in which said pressure chamber is of minimum volume, and
  (iv) a vent port opening into said bore for venting fluid under pressure from said pressure chamber upon predetermined movement of said piston responsive to fluid pressure established in the brake cylinder means sufficient to uncover said vent port, and
 (d) means controlled by the relative position of the sprung and unsprung members of the truck for blocking movement of said piston responsive to fluid pressure in the brake cylinder when the load on the car truck exceeds a certain amount.

2. A foundation brake rigging, as claimed in claim 1, further characterized in that:

(a) said strut cylinder device is carried on at least one of said pair of brake beams, and
(b) said last means includes:
(i) a stem for said piston movable coaxially therewith, and
(ii) means movable with the sprung part of the truck cooperating with said stem for permitting movement of said piston responsive to fluid pressure acting thereon when the load on the car is less than a certain amount and preventing movement of said piston responsive to fluid pressure acting thereon when the load on the car exceeds said certain amount.

3. A foundation brake rigging for a wheeled railway car truck of the type having a laterally extending bolster vertically deflectable to varying degrees with respect to the unsprung part of the truck according to the load on the car truck, comprising, in combination with said bolster:
(a) a pair of brake beams disposed in parallel relation to each other on opposite sides respectively of said bolster and movably supported for movement toward and away from the wheels of the car truck to effect brake application and brake release,
(b) brake cylinder means carried by each brake beam and reacting with the opposite brake beam for effecting movement of the brake beams,
(c) strut cylinder means for said brake cylinder means comprising:
(i) a piston subject to fluid pressure in a chamber on one side thereof having fluid pressure communication with the brake cylinder means,
(ii) spring means opposing movement of said piston responsively to fluid pressure acting thereon in said chamber,
(iii) a strut member movable with said piston,
(d) a vent port in said strut cylinder uncovered by said piston in moving a predetermined distance responsively to fluid pressure acting thereon in said chamber to release fluid pressure from the said chamber so long as fluid pressure in the chamber and connected brake cylinder means exceeds a predetermined value, and
(e) slot means in said bolster in alignment with the said strut member, when the load on the bolster is less than a certain amount, into which said strut member passes, to permit movement of said piston responsively to fluid pressure acting thereon in said chamber sufficient to uncover said vent port, said slot means being moved out of alignment with said strut member when the load on the said bolster exceeds said certain amount, to cause said bolster to block movement of said strut member and thereby said piston sufficient to uncover said vent port to thereby enable buildup of pressure in the brake cylinder means above said predetermined value.

4. A foundation brake rigging for a wheeled railway car truck, as claimed in claim 3, further characterized in that said strut member comprises a flexible end portion which, while in said slot means in said bolster, resiliently yields upon engagement therewith by the bolster upon momentary changes in deflection of the bolster under traveling conditions.

5. A foundation brake rigging for a wheeled railway car truck, as claimed in claim 3, further characterized by stop means on said bolster effective to block entry of said strut member into said slot means due to momentary changes in position of the bolster incident to travel under service conditions while said strut member and said piston are blocked against movement by said bolster.

6. A foundation brake rigging for a wheeled railway car truck, as claimed in claim 3, further characterized by:
(a) stop means on said bolster effective to block entry of said strut member into said slot means due to momentary changes in position of the bolster incident to travel under service conditions while said strut member and said piston are blocked against movement by said bolster, and
(b) a flexible end portion on said strut member which resiliently yields upon engagement with said stop means.

7. A foundation brake rigging, as claimed in claim 1, further characterized by volume means connected to said vent port.

8. A foundation brake rigging, as claimed in claim 7, further characterized in that said spring means exerts a biasing force on said piston sufficient to insure buildup of pressure in said brake cylinder means and connected chamber of said strut cylinder device adequate for a minimum degree of brake application prior to said piston uncovering said vent port.

9. Brake apparatus for a railway car truck of the type having sprung and unsprung members comprising, in combination:
(a) brake cylinder means effective when pressurized to cause a brake application and when depressurized to effect a brake release,
(b) pressure limiting means comprising:
(i) a cylinder device having a bore,
(ii) a piston slidably operable in said bore and having a pressure chamber at one side thereof in constant communication with said brake cylinder means,
(iii) spring means biasing said piston toward a position in which said pressure chamber is of minimum volume,
(iv) said cylinder having a vent port opening out of said bore for venting fluid under pressure from said pressure chamber upon predetermined movement of said piston out of its normal position responsive to fluid pressure established in the brake cylinder means sufficient to uncover said vent port, and
(c) means conditioned according to the relative positions of the sprung and unsprung members of the car truck for preventing movement of said piston when the load on the car exceeds a certain value.

References Cited
UNITED STATES PATENTS
3,088,550  5/1963  Kirk _____ 188—52

FOREIGN PATENTS
602,381  5/1948  Great Britain.
602,382  5/1948  Great Britain.

DUANE A. REGER, *Primary Examiner.*
EUGENE G. BOTZ, *Examiner.*